Sept. 22, 1959  A. H. FRÖHLICH ET AL  2,904,833
DOUBLE ACTING SEALING RING FOR VULCANIZING PNEUMATIC TIRES
Filed July 30, 1956  3 Sheets-Sheet 1

INVENTORS
ADOLF FRÖHLICH &
EDWARD J. HARRIS
BY J. William Freeman
ATTORNEY

Sept. 22, 1959  A. H. FRÖHLICH ET AL  2,904,833
DOUBLE ACTING SEALING RING FOR VULCANIZING PNEUMATIC TIRES
Filed July 30, 1956  3 Sheets-Sheet 2

INVENTORS
ADOLF FRÖHLICH &
EDWARD J. HARRIS
BY
ATTORNEY

INVENTORS
ADOLF FROHLICH &
EDWARD J. HARRIS
ATTORNEY

United States Patent Office 2,904,833
Patented Sept. 22, 1959

2,904,833
DOUBLE ACTING SEALING RING FOR VULCANIZING PNEUMATIC TIRES

Adolf H. Fröhlich and Edward J. Harris, Akron, Ohio, assignors to The Cleveland Trust Company, Cleveland, Ohio, as trustee Application July 30, 1956, Serial No. 600,903

12 Claims. (Cl. 18—17)

This invention relates to the art of pneumatic tire vulcanization and in particular has reference to improvements in sealing rings employed between the beads of pneumatic tires during such processes.

In the art of pneumatic tire vulcanization, including the curing of new tires and recapping of worn tires, it has oftentimes been attempted to position an endless ring between the bead portions of the tire being cured to effectuate a sealing point so that a closed internal cavity may be provided interiorly of the tire being cured.

Throughout the development of the art, several types and forms of sealing rings have been proposed for this purpose.

Several types of prior art presses that utilize relative movement between the mold sections may be employed in combination with these rings. A typical press of this general type is set forth in co-pending application Serial No. 583,777, filed May 9, 1956, by Adolf Fröhlich and Edward J. Harris.

Notwithstanding these previous attempts in this regard, one problem has remained prevalent in bagless vulcanizing. This problem relates to the fact that the diameter of the sealing ring is always larger than the diameter of the bead of the tire being cured, with the result that difficulty has been encountered in effectuating positioning of this sealing ring between the bead portions of the tire being cured.

Such attendant difficulties have been found to exist with respect to both the curing of new tires and the recapping of worn casings due to the fact that the bead diameter in either case always remains inflexible and the ring must, accordingly, be positioned inside of this inflexible dimension.

In co-pending application No. 565,721, filed February 15, 1956 by Adolf Fröhlich and Edward J. Harris, there was disclosed an improved type of sealing ring that is characterized by the use of a hinge type construction wherein the sealing ring was divided into a pair of semi-hemispherical segments that were hinged together at their ends so as to be collapsible to a condition of reduced dimension across one width thereof.

However, while this hinging action operated to reduce the effective dimension in one direction, the salient fact remains that the remaining dimension, 90° thereto, remained unaffected due to the fact that no collapse was made between the jointed ends of the individual segments.

In co-pending application No. 600,935, filed July 30, 1956, by Adolf Fröhlich and Edward J. Harris, there was disclosed a sealing ring of this general character that featured the further improvement that the same was, in addition to being collapsed by a hinging action, tilted with respect to the vertical axis of the mold section with the result that the effective diameter thereof was decreased in all directions so that this ring could easily be passed between bead sections of the tire and then subjected to a straightening and uncocking action so as to be positioned interiorly of the tire between the bead portions thereof.

While the last-mentioned improvement has been found satisfactory in the great majority of cases, it has been found that even further improved results can be obtained if the bead ring is shifted transversely of one mold section during its axial movement. It has been found that in addition to aiding positioning of the ring during the closing of the mold sections, that such a transverse movement during opening aids greatly in stripping of the tire with respect to the mold sections and further aids greatly in removing the ring section from the cured tire.

It accordingly becomes a principal object of this invention to provide an improved type of sealing ring characterized by a combined hinge and cocking action, together with a transverse shifting movement during its axial change of position during close of the mold sections.

It is a further object of this invention to provide an improved type of vulcanizing press characterized by the use therein of a sealing ring that is carried by one component element thereof with such sealing ring being shifted transversely of the mold sections during the closing movement thereof.

These and other objects of the invention will become more apparent upon a reading of the following brief specification, considered and interpreted in the light of the accompanying drawings.

Figure 1:
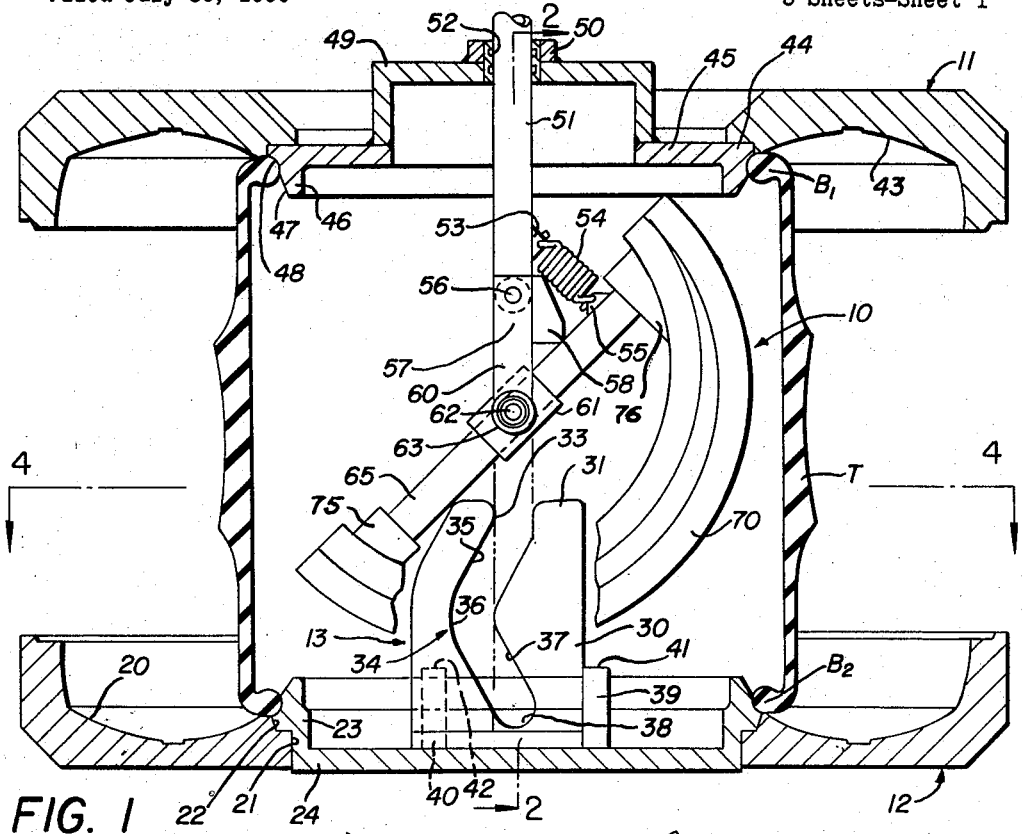
Figure 1 is a sectional view, partially schematic, and illustrating the conditon of the component parts in the partially closed position.

Referring now to the drawings, and in particular to Figures 1 through 4 thereof, the improved sealing ring, generally designated by the numeral 10, is shown carried by an upper mold section 11 of a vulcanizing press so as to have the edge portions thereof positionable between the beads $B_1$ and $B_2$ of a tire T upon coaction of the ring 10 with guide means 13 during closing movement of the upper mold section 11 towards engagement with lower mold section 12, during closing of the press.

Considering first the structure of the lower mold section 12, it will be seen from the drawing that the same is of annular configuration and includes the usual design imparting surface 20 that additionally has a central aperture 21 therein that defines, with design imparting surface 20, an undercut 22 within which may be seated a ring member 23 that is defined by the peripheral edge of a plate 24 that operates to seal the entire diameter of the lower mold section 12. This ring 23 includes a bead seat 25 as well as an inclined surface 26 for purposes to be described.

Considering next the construction of the guide means 13, it will be seen from the drawings that the same include a rectangular plate 30 that is secured in known manner, as by welding, for example, to the plate 24 in the central portion thereof. This plate 30 supports a pair of upright cam arms 31 and 32, of identical flat outlined configuration identical with the outline configuration of the cam plate 32 being shown in Figure 1 of the drawings. Each cam plate 31 and 32 accordingly is provided with a slotted mouth opening 33 that defines a trackway indicated generally by the numeral 34 that includes an upper tapering portion 35, a central portion 36, a lower angularly extending portion 37, and a lower end portion 38. In addition to the aforementioned parts the base 24 also supports, as best shown in Figure 2 of the drawings, a pair of blocks 39 and 40 that have contoured surfaces 41 and 42 respectively that are designed for co-action with the ring member 10 as will be presently described.

Figure 2:
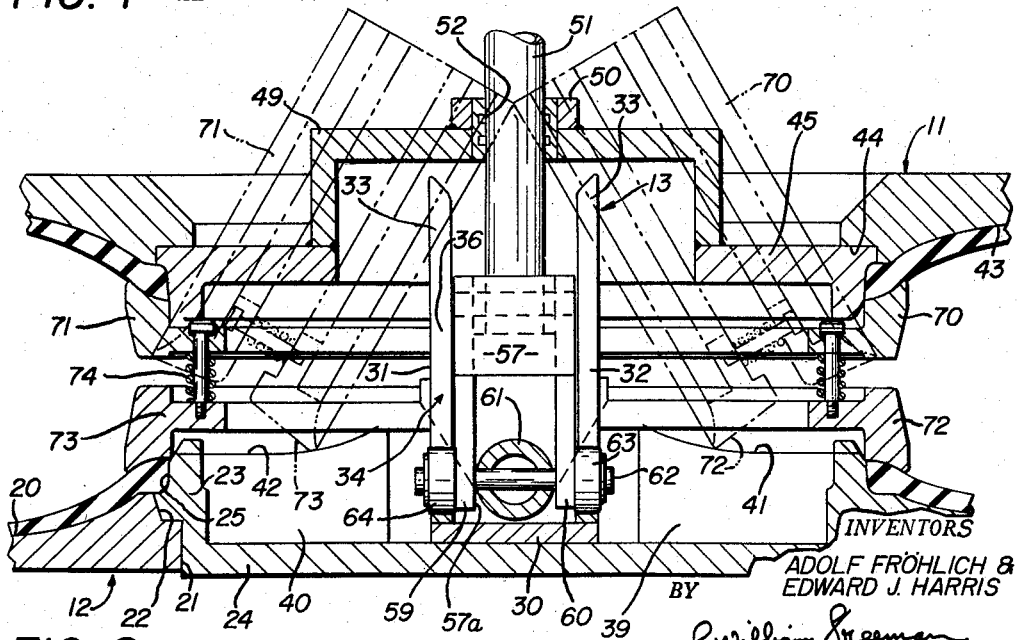
Figure 2 is a view taken on the lines 2—2 of Figure 1 and illustrating the component parts in chain-dotted lines and also showing in full dotted lines the position of the component parts in the fully closed position.

The ring member 10 is carried by the upper mold section 11 and to this end the upper mold section 11 includes, in addition to the usual design imparting cavity 43 thereof, an undercut seal 44 within which may be received a ring member 45 having a peripheral flange 46 that defines an inclined surface 47 and a bead seat 48 for coaction of the bead $B_1$ of the tire T as shown in Figure 1 of the drawings.

Additionally, the central opening of the ring 45 is shown spanned by a head casting 49 which has a boss 50 that receives, in axially shifting relationship therewith, a shaft 51, with packing 52 being employed in known manner in this regard to facilitate a sealed connection between the shaft 51 and the boss 50. The lower end of the shaft 51 is shown provided with a lug 53 to which is secured a spring 54, the opposite end of which is secured to a similar lug 55 that is carried by the ring member 10.

Additionally, the extreme lower end of the shaft 51 is reduced to receive, by pin 56, an auxiliary shaft 57 that is pivotally secured with respect to the shaft 51 by use of the aforementioned pin 56. This auxiliary shaft 57 includes a projecting lug 58 that contacts the ring 10 for the purpose of limiting the extent of axial cocking movement thereof as will presently be described.

In order to facilitate mounting of the shaft 57 with respect to the ring 10, the lower end thereof is shown defining a yoke 57a that has legs 59 and 60 that are pinned to bushing 61 by use of a pin 62. Also mounted on this pin 62 are rollers 63 and 64 that are designed for coaction with the trackways 34 as will be presently described. As has been previously indicated, the bushing 61 surrounds a shaft 65 of the ring member 10, and in this manner the shaft 65 is free to rotate about the axis of the pin 62 with urging of the shaft 65 to a full line position of Figure 1 being caused by the compressive force offered by the spring 54 that interconnects lug 53 and 55, the latter lug being attached to shaft 65 as clearly shown in Figure 1 of the drawings. In this regard, it may be also noted that the lug 58 serves as a stop to limit the cocking movement of the shaft 65 to the full line position of Figure 1 of the drawings.

With regard to the construction of the ring 10 per se it is to be noted that the detailed ring shown in the drawings is of the type set forth in co-pending application, No. 565,721, filed February 15, 1956, by Adolf Fröhlich and Edward J. Harris and accordingly, reference is made to that case for a detailed description of the same. It suffices in this regard in connection with this disclosure to indicate that the ring 10 includes semi-hemispherical segments 70 and 71 that are designed to engage the upper bead $B_1$ and also semi-hemispherical segments 72 and 73 that engage bead $B_2$, the arrangement being such that springs 74, 74, interposed between the segments 70 and 72 on one hand, and segments 71 and 73 on the other hand, operate to tensionally urge the individual segments axially apart with brackets 75 and 76 facilitating pivotal hinging of the segments about the shaft members 65. It will be apparent in later portions of this specification that equivalent rings could be substituted for the ring construction shown herein in this preferred embodiment of the invention.

In use or operation of the improved vulcanizing press, it will first be assumed that the positioned parts are positioned in the fully open condition with the mold section 11 being even further separated from the lower mold section 12 that is illustrated in Figure 1 of the drawings.

With the component parts thus assembled, the ring member 10 will be in the collapsed and cocked position shown in Figure 1 and will be out of contact with respect to the guide means 13. Accordingly, at this time, the lower bead portion $B_2$ of the tire T may be placed upon the bead seat 25 of the ring 23 and with the flat built tire T thus positioned, the mold sections may be moved toward each other.

As as result of the ring 10 being in its collapsed and cocked postion, the lower bead portion $B_2$ of the tire T will easily clear the same.

At the time the upper mold section reaches the condition of Figure 1, the upper bead portion $B_1$ will be engaged by the bead seat 48 of the rib 46, and accordingly, upon further movement of the mold section 11 downwardly towards the mold section 12, the tire T will deform in its medial region so as to radially expand towards a toroidal shape for registry with the mold sections upon closure.

When the position of Figure 1 has been reached, the shaft 51 may be moved relatively of the upper mold section 11 in known manner and upon downward (Figure 1) movement thereof, the rollers 63 and 64 will enter the mouth openings 31, 31 of trackway 34, 34. Also, at this time, as is clearly shown in Figure 2 of the drawings, the lower edge portions of the ring sections 72 and 73 will contact the inclined surfaces 41 and 42 of the block members 39 and 40 respectively, with the result that as further downward movement occurs, a spreading apart movement will occur with respect to the hinged sections 70 and 72 on the one hand and 71 and 73 on the other hand. As movement occurs in this regard it is believed apparent that these ring sections 70 and 71, and 72 and 73 will assume the position of parallelism shown in Figure 2 of the drawings.

Figure 3:
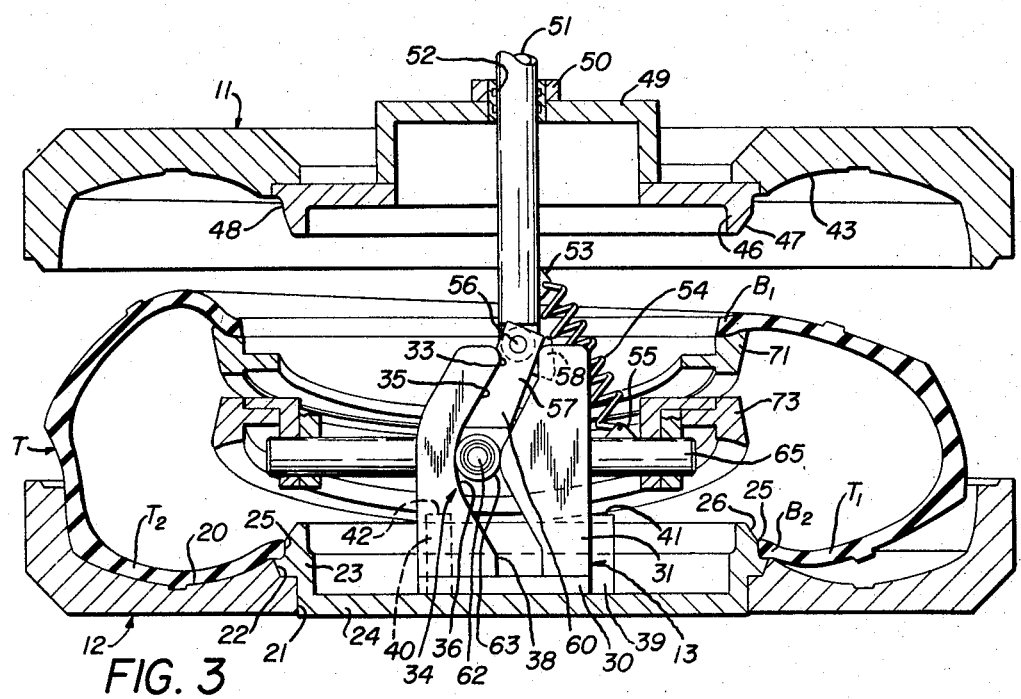
Figure 3 is a view similar to Figure 1 but showing that the position of component parts just after opening of the mold section, upon completion of the vulcanizing cycle.
Figure 4:
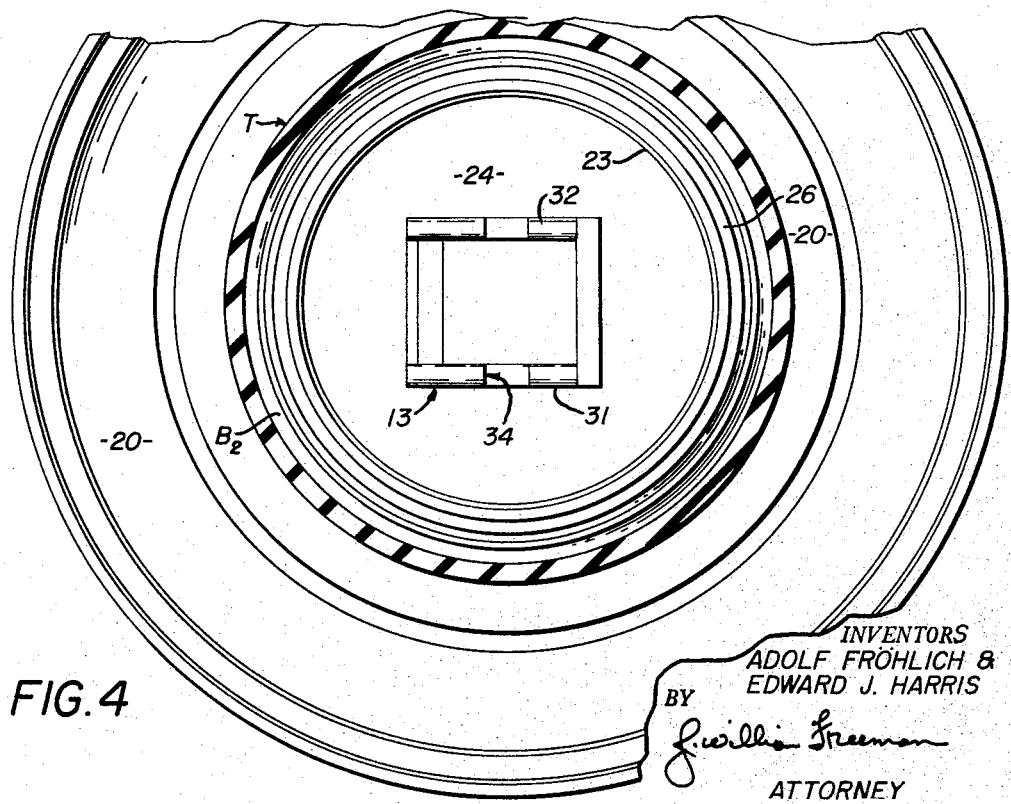
Figure 4 is a view taken on the lines 4—4 of Figure 1.

Also, upon further downward movement of the shaft 51, the rollers then will enter the portion of the guide tracks 34, 34 that has been designated by the numeral 35. This contact between the rollers 63 and 64 with these portions 35, 35, will cause the pin 62 to move to the left of Figure 1 of the drawings with the whole ring assembly being accordingly shifted to the left during such movement, with the maximum point of such transverse shifting being reached when the rollers 63 and 64 are in contact with the portion that has been designated by the numeral 36. This condition of the rollers is shown in Figure 3 of the drawings.

As further downward movement of the shaft 51 continues it is believed apparent that the rollers 63 and 64 will enter that portion designated 37, 37 to result in transverse movement to the right of Figure 1 until the bottom portion 38 is reached at which time all movement will be terminated. It is to be noted that during the downward movement of the rollers 63 and 64 within the guide tracks 34, 34, that has just been described, the shaft 65 will also be rotating clockwise against the force afforded by the spring 54, with such movement occurring as a result of the contact between the ring segments 72, 73, and the contoured surfaces 41 and 42 of blocks 39 and 40 respectively.

In this downward movement which has just been described, it will be noted that by first moving the entire ring assembly 10 to the left of Figure 1, the ends of the arcuate segments will be moved in between the bead portions $B_1$ and $B_2$ at the left of Figure 1, while the right hand hinged end of the ring 10 will then pass between the collapsing bead portions $B_1$ and $B_2$ at the right hand of Figure 1 as a result of movement of rollers 63, 64 through track portions 37, 37. Thus, the maximum diameter created is alternately passed between the bead sections on opposite sides of the tire T with the result that these bead sections are then easily and quickly positioned with respect to the tire T as is best shown in the full dotted line positions of Figure 2 of the drawings.

When it is desired to remove the tire T, it is merely necessary that the mold section 11 first be moved slightly with respect to the lower mold section 12 to effectuate a stripping with respect to the upper portion of the tire T, with the contact of the ring segments 72 and 73 with the lower bead portion $B_2$ holding this bead portion in contact with respect to the lower mold section 12. When this preliminary stripping has been effectuated and the upper mold 11 is free of the tire as shown in Figure 3 of the drawings, the rod 51 may be moved vertically upward so as to cause an equivalent movement of the rollers 63 and 64 within the guide tracks 34, 34. As a result of these rollers moving within that portion designated as 37, it is believed apparent that the ring movement will be upwardly and to the left of Figure 2 towards a position of Figure 3, with such movement resulting in stripping of that portion of the tire designated $T_1$ with respect to the right hand portion of the lower mold 12 (Figure 3). When the condition of Figure 3 is reached, the ring section will begin its movement to the right as a result of the rollers 63, 64 entering that portion of the guide track that has been designated by the numeral 35, and at this time the equivalent stripping of the tire portion $T_2$ will occur with respect to the design imparting surface 20 provided on the left hand of the mold as viewed from Figure 3 of the drawings. It is believed apparent that at this time, the tire T is completely stripped with respect to both mold sections and at this time the cocking and collapsing action will occur upon further movement of the shaft 51 upwardly so that the ring 10 will thus be completely removed with respect to the tire T which has previously been removed with respect to both mold sections. Accordingly, when the mold section 11 is completely raised, the ring section 10 will be clear of the tire T which, having been previously stripped, may easily be removed for insertion of the next tire in repetition of the above-described cycle of events.

Figure 5:
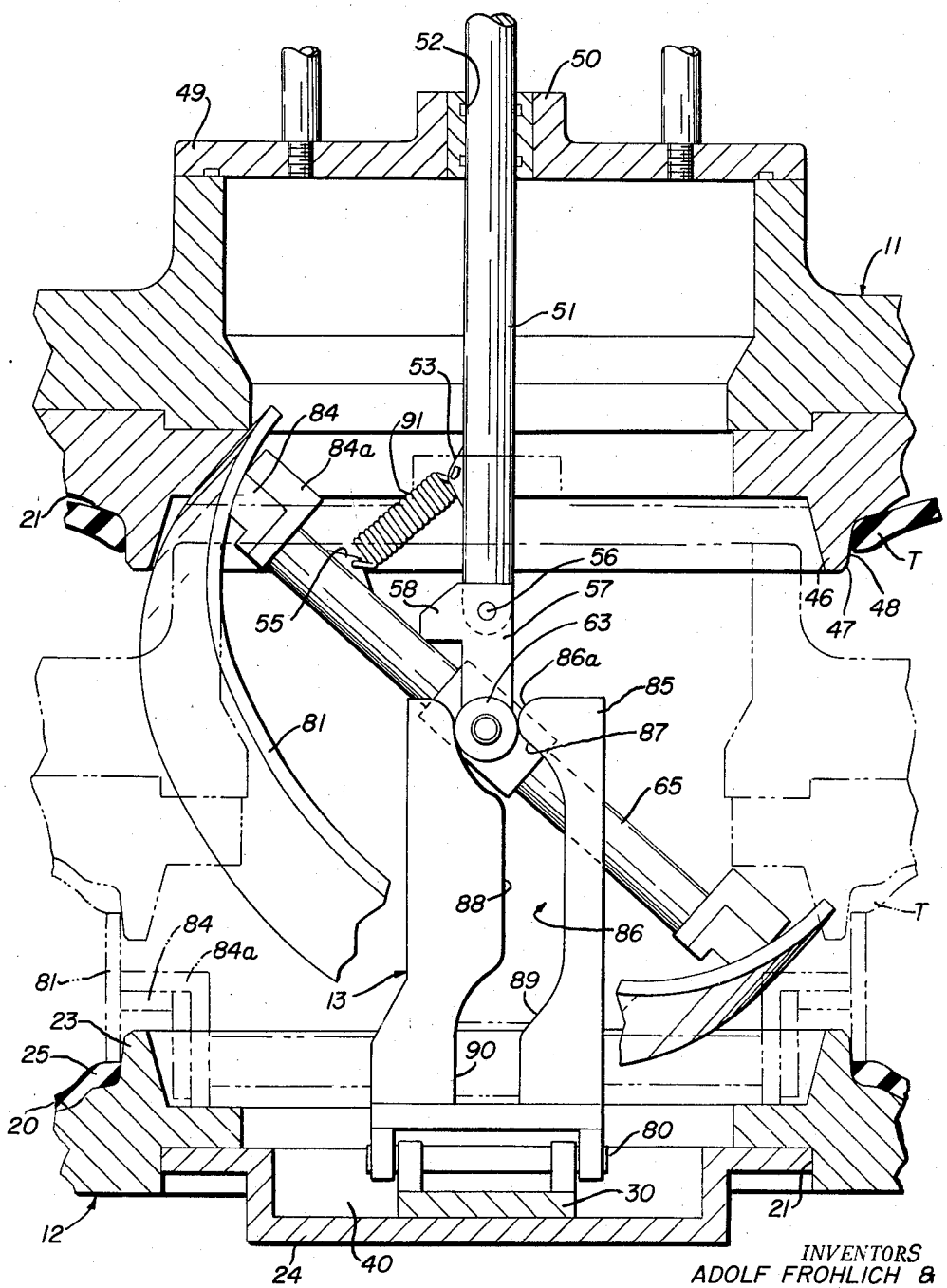
Figure 5 is a sectional elevation of a modified form of the invention.

The modified form of the invention shown in Figure 5 of the drawings is similar in many respects to that just described in connection with Figures 1 through 4 of the drawings, and accordingly, where indicated, like numerals designate like parts.

In this modified form of the invention, the primary improvement lies with respect to the construction of the guide means 13 and accordingly, the same is shown fixed with respect to the plate 24 by means of a pivot pin 80 that allows the same to pivot with respect to the lower mold section 12.

In view of the fact that this modified form of the invention is designed primarily for use in recapping operations, the same has arcuate ring sections 81 and 82 hinged together about a rod 65 by use of the brackets 84 and 84a. The guide means 13 further include upright plates 85, 85 that have guide tracks designated generally by the numeral 86 which are slightly different in configuration than tracks 34, 34 and which include a mouth opening 86a, an intermediate angularly disposed segment 87, a vertical segment 88, a lower angularly disposed segment 89 and a bottom segment 90.

In use or operation of this modified form of the invention, the operation of the mold sections is substantially as previously described with the exception of a tire T that is received within the mold sections to be formed to toroidal configuration prior to use in connection with this device. Accordingly, as the rollers 63 and 64 of Figure 5 enter the mouth opening 86, the same will, upon further downward movement of the shaft 51, enter the section 87 at which time the entire ring segment 10 will be moved to the right of Figure 5. Further downward movement of the shaft 51 will result in the rollers 63, 64 entering the section 88, at which time a vertical movement of the ring 10 will occur. As the rollers 63, 64 leave the section 88, they will then enter the section 89 and move to the left of Figure 5 to their lowermost position as the same is defined by the segment 90 thereof.

It will be seen that the above described movement would be opposite upon opening of the press with the ring section first being moved to the right of the lower mold section 12 and then listed vertically as a result of going through the segment 88. This vertical movement would then be followed by transverse movement to the left of Figure 5 so that the ring would be completely stripped with respect to the tire T while the same had been stripped with respect to both mold sections as a result of the oscillatory movement of the ring across the lower mold section 12 during the opening of the press. Collapsing and cocking by springs, such as 91, would be as before.

It will be seen from the foregoing that there has been provided a new and novel type of vulcanizing press that is characterized by the use of a sealing ring that is collapsible to a reduced effective diameter and which is further characterized by the fact that the same may shift transversly of both mold sections during the opening and closing of the same in operation of the press.

It has been shown how this transverse movement across these mold sections operates to strip the tire with respect to the mold sections and how the same also operates to automatically strip the ring with respect to the tire.

While a preferred embodiment of the invention has been illustrated in detail in accordance with the patent statutes, it is to be understood that the specification is not intended to be so limited.

Accordingly, modifications of the invention may be resorted to without departing from the spirit hereof or the scope of the appended claims.

This application is a continuation-in-part of co-pending application Serial No. 600,935, filed July 30, 1956, by Adolph Frölich and Edward J. Harris, and is also a continuation-in-part of co-pending application Serial No. 565,721, filed February 15, 1956, by Adolph Fröhlich and Edward J. Harris.

What is claimed is:

1. A vulcanizing press of the character described, comprising; a pair of complemental, relatively movable mold sections movable between open and closed positions; bead ring means including a pair of semi-circular bead ring segments hinged together at their arcuate ends about a common transverse frame member so as to be shiftable into and out of coplanar relationship with each other; connecting means carried by and projecting axially from one mold section in axially shiftable relationeship therewith and having the projecting end thereof connected to said transverse frame member whereby said bead ring means are suspended from said mold section by said connecting means; said bead ring means being shifted transversely of at least one mold section during axial shifting of said connecting means.

2. A vulcanizing press of the character described, comprising; a pair of complemental, relatively movable mold sections movable between open and closed positions; bead ring means including a pair of semi-circular bead ring segments hinged together at their arcuate ends about a common transverse frame member so as to be shiftable into and out of coplanar relationship with each other; connecting means carried by and projecting axially from one mold section in axially shiftable relationship therewith and having the projecting end thereof pivotally connected to said transverse frame member whereby said bead ring means are suspended from said mold section by said connecting means; said bead ring means being shifted transversely of at least one mold section during axial shifting of said connecting means.

3. A vulcanizing press of the character described, comprising; a pair of complemental, relatively movable mold sections movable between open and closed positions; bead ring means including a pair of semi-circular bead ring segments hinged together at their arcuate ends about a common transverse frame member so as to be shiftable into and out of coplanar relationship with each other; connecting means carried by and projecting axially from one mold section in axially shiftable relationship therewith and having the projecting end thereof connected to said transverse frame member whereby said bead ring means are suspended from said mold section by said connecting means; said bead ring means being shifted transversely of at least one mold section during axial shifting of said connecting means; said connecting means including a pair of link arms pivotally connected together at one end thereof and connected at the other ends thereof to said frame member and one said mold section.

4. The device of claim 3, wherein said link arms are pivotally connected to said frame member.

5. The device of claim 3, wherein the said link arms are connected to said mold section in axially shiftable relationship therewith.

6. The device of claim 3, wherein one said link arm is pivotally connected to said frame member and the other said link arm is connected to said mold section in axially shiftable relationship therewith.

7. A vulcanizing press of the character described, comprising; a pair of complemental, relatively movable mold sections movable between open and closed positions; bead ring means including a pair of semi-circular bead ring segments hinged together at their arcuate ends about a common transverse frame member so as to be shiftable into and out of coplanar relationship with each other; connecting means carried by and projecting axially from one mold section in axially shiftable relationship therewith and having the projecting end thereof connected to said transverse frame member whereby said bead ring means are suspended from said mold section by said connecting means; said bead ring means being shifted transversely of at least one mold section during axial shifting of said connecting means; said shifting means including at least one cam member carried by said remaining mold section and being engaged by said ring upon closing of said mold sections.

8. A vulcanizing press of the character described, comprising; a pair of complemental, relatively movable mold sections movable between open and closed positions; bead ring means including a pair of semi-circular bead ring segments hinged together at their arcuate ends about a common transverse frame member so as to be shiftable into and out of coplanar relationship with each other; connecting means carried by and projecting axially from one mold section in axially shiftable relationship therewith and having the projecting end thereof connected to said transverse frame member whereby said bead ring means are suspended from said mold section by said connecting means; said bead ring means being shifted transversely of at least one mold section during axial shifting of said connecting means; said shifting means including an upright plate projecting from said remaining mold section; said plate having a slot therein; said connecting means including a roller member receivable in said slot during opening and closing of said press.

9. A vulcanizing press of the character described, comprising; a pair of complemental, relatively movable mold sections movable between open and closed positions; bead ring means including a pair of semi-circular bead ring segments hinged together at their arcuate ends about a common transverse frame member so as to be shiftable into and out of coplanar relationship with each other; connecting means carried by and projecting axially from one mold section in axially shiftable relationship therewith and having the projecting end thereof connected to said transverse frame member whereby said bead ring means are suspended from said mold section by said connecting means; said bead ring means being shifted transversely of at least one mold section during axial shifting of said connecting means; and means for normally maintaining said ring out of parallel with said mold sections.

10. A vulcanizing press of the character described, comprising; a pair of complemental, relatively movable mold sections movable between open and closed positions; bead ring means including a pair of semi-circular bead ring segments hinged together at their arcuate ends about a common transverse frame member so as to be shiftable into and out of coplanar relationship with each other; connecting means carried by and projecting axially from one mold section in axially shiftable relationship therewith and having the projecting end thereof connected to said transverse frame member whereby said bead ring means are suspended from said mold section by said connecting means; said bead ring means being shifted transversely of at least one mold section during axial shifting of said connecting means; and means for normally maintaining said ring out of parallel with said mold sections; said last-mentioned means including a spring interconnecting a projecting portion of said connecting means and said frame member.

11. A vulcanizing press of the character described, comprising; a pair of complemental, relatively movable mold sections movable between open and closed positions; bead ring means including a pair of semi-circular bead ring segments hinged together at their arcuate ends about a common transverse frame member so as to be shiftable into and out of coplanar relationship with each other; connecting means carried by and projecting axially from one mold section in axially shiftable relationship therewith and having the free end thereof connected to said transverse frame member whereby said bead ring means are suspended from said mold section by said connecting means; said bead ring means being shifted transversely of at least one mold section during axial shifting of said connecting means; and means for normally maintaining said ring out of parallel with said mold sections; said last-mentioned means including a spring interconnecting said hinged segments and collapsing the same about said frame member.

12. The device of claim 8 wherein said slot is offset.

References Cited in the file of this patent
UNITED STATES PATENTS

| | | |
|---|---|---|
| 1,757,376 | Laursen | May 6, 1930 |
| 2,571,258 | Kolins | Oct. 16, 1951 |
| 2,603,580 | Di Cicco et al. | July 15, 1952 |